(12) United States Patent
Nishimura et al.

(10) Patent No.: US 7,796,009 B2
(45) Date of Patent: Sep. 14, 2010

(54) TRANSACTION QUALITY SYSTEM AND QUALITY ASSURANCE METHOD

(75) Inventors: Takehiko Nishimura, Kawasaki (JP); Tetsuya Matsushima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 902 days.

(21) Appl. No.: 11/636,503

(22) Filed: Dec. 11, 2006

(65) Prior Publication Data
US 2007/0241860 A1  Oct. 18, 2007

(30) Foreign Application Priority Data
Apr. 17, 2006 (JP) ............................. 2006-113370
Jun. 28, 2006 (JP) ............................. 2006-178101

(51) Int. Cl.
*G05B 19/00* (2006.01)
*G06F 7/00* (2006.01)
*G06K 19/00* (2006.01)
*H04B 1/00* (2006.01)
*H04Q 1/00* (2006.01)

(52) U.S. Cl. ............... 340/5.21; 340/5.9; 340/5.72; 340/5.8; 340/568.1; 455/41.2

(58) Field of Classification Search .................. 340/5.2, 340/568.1, 5.21, 5.9, 572.1, 5.8; 235/375; 700/225
See application file for complete search history.

(56) References Cited

U.S. PATENT DOCUMENTS 7,034,683 B2 *  4/2006  Ghazarian ................ 340/568.1
2003/0197591 A1 * 10/2003  Bates ........................ 340/5.21

FOREIGN PATENT DOCUMENTS

JP            11-208792          8/1999

* cited by examiner

*Primary Examiner*—Brian A Zimmerman
*Assistant Examiner*—Nam V Nguyen
(74) *Attorney, Agent, or Firm*—Staas & Halsey LLP

(57) ABSTRACT

A managing unit manages an identifier for identifying an authenticated container that is authenticated as a legitimate container. An inquiring unit inquires, before transferring a substance between containers, the managing unit whether both of the containers are the authenticated containers. An approving unit approves a transaction of the substance, upon acquiring a response from the inquiring unit saying that both of the containers are the authenticated containers.

8 Claims, 10 Drawing Sheets

| DEVICE INFORMATION | | SOFTWARE INFORMATION | | |
|---|---|---|---|---|
| DEVICE NAME | VERSION | SOFTWARE NAME | VERSION | HASH VALUE |
| SOLENOID VALVE | 1.0 | CONTROLLER | 2.0 | XXXXXXX |
| OPEN/CLOSE SENSOR | 1.2 | COMMUNICATION CONTROL PROGRAM | 3.0 | YYYYYYY |
| ... | ... | ... | ... | ... |

FIG.10

TRANSACTION QUALITY SYSTEM AND QUALITY ASSURANCE METHOD

CROSS REFERENCE TO RELATED APPLICATIONS

This application claims the benefit under 35 U.S.C. Section 119, of Japanese Patent Application Nos. 2006-113370 and 2006-178101, filed Apr. 17, 2006 and Jun. 28, 2006 respectively, which are hereby incorporated by reference in their entirety into this application.

BACKGROUND OF THE INVENTION

1. Field of the Invention

The present invention relates to a technology for assuring quality of a product supplied in a container for a transaction, at all transaction stages.

2. Description of the Related Art

A quality assurance of a commercial product has been realized by attaching a radio frequency identification (RFID) tag to, for example, food product (i.e., beef or vegetable) and recording a place of production and/or distribution routes in the RFID tag. With a use of the RFID tag attached to the commercial product, it becomes possible to convey detailed information of the commercial, product to consumers and traders.

However, for realizing the quality assurance of the commercial product through the RFID tag, it is required that information stored in the RFID tag is not to be fraudulently altered. Thus, an organization named trusted computing group (TCG) proposes a specification of a security chip with a function that prevents fraudulent alteration of data and programs stored in the security chip.

If the security chip implemented with the specification proposed by the TCG is used, the quality assurance of solid products can be realized. However, for assuring the quality of liquid products or gaseous products supplied in a container, it is necessary to manage even opening and closing of an inlet/outlet of the container.

In an area of oil distribution, there is a threat that oil with unauthorized quality (unauthorized oil) is to be mixed due to a malicious operation or a misoperation, at each distribution stage of manufacturing oil in an oil refinery, transporting the oil by a distributor using a tank truck, delivering the oil to a wholesaler in, for example, a gas station, and selling the oil to an end user. Therefore, there is a strong demand from users for assuring oil quality in the area of the oil distribution.

For example, Japanese Patent Application Laid-open No. H11-208792 discloses a technology for installing an identification (ID) device that stores information of the type of oil to be refilled, on a vehicle, reading the ID device through an oil refilling device in the gas station, and determining the type of oil to be refilled, so that misoperation for refilling different oil can be prevented.

However, with the conventional technologies, it is difficult to prevent a malicious operation of mixing the unauthorized oil during an oil distributing process. It is because the technologies disclosed in the above document is for preventing only a misoperation over oil transactions and the technologies are not suitable for preventing the malicious operation of mixing the unauthorized oil. Even the oil type to be refilled can be specified with the conventional technologies, there still is a possibility that an operator maliciously feed different oil.

Accordingly, there is a strong demand for realizing the quality assurance system with which mixing of the unauthorized oil can be prevented over all distribution stages in the area of the oil distribution. The demand is raised not only for oil product, but also for other products (i.e., liquid product, gaseous product, and granulated solid product) supplied in a container for a transaction.

SUMMARY OF THE INVENTION

It is an object of the present invention to at least partially solve the problems in the conventional technology.

A system according to one aspect of the present invention is for assuring quality of a substance transacted by being transferred from container to container. The system includes a managing unit that manages an identifier for identifying an authenticated container that is authenticated as a legitimate container; an inquiring unit that inquires, before transferring the substance between containers, the managing unit whether both of the containers are the authenticated containers; and an approving unit that approves a transaction of the substance, upon acquiring a response from the inquiring unit saying that both of the containers are the authenticated containers.

A method according to another aspect of the present invention is for assuring quality of a substance transacted by being transferred from container to container. The method includes managing an identifier for identifying an authenticated container that is authenticated as a legitimate container; inquiring, before transferring the substance between containers, the managing whether both of the containers are the authenticated containers; and approving a transaction of the substance, upon acquiring a response from the inquiring saying that both of the containers are the authenticated containers.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained below in detail with reference to the accompanying drawings. The present invention is not limited to the embodiments explained below. A quality assurance system according to the present invention is explained with an example of assuring the quality of oil transacted between business places, such as an oil refinery, an oil stock base, and a service station (gas station), through a transportation equipment such as a tank truck.

Figure 1:
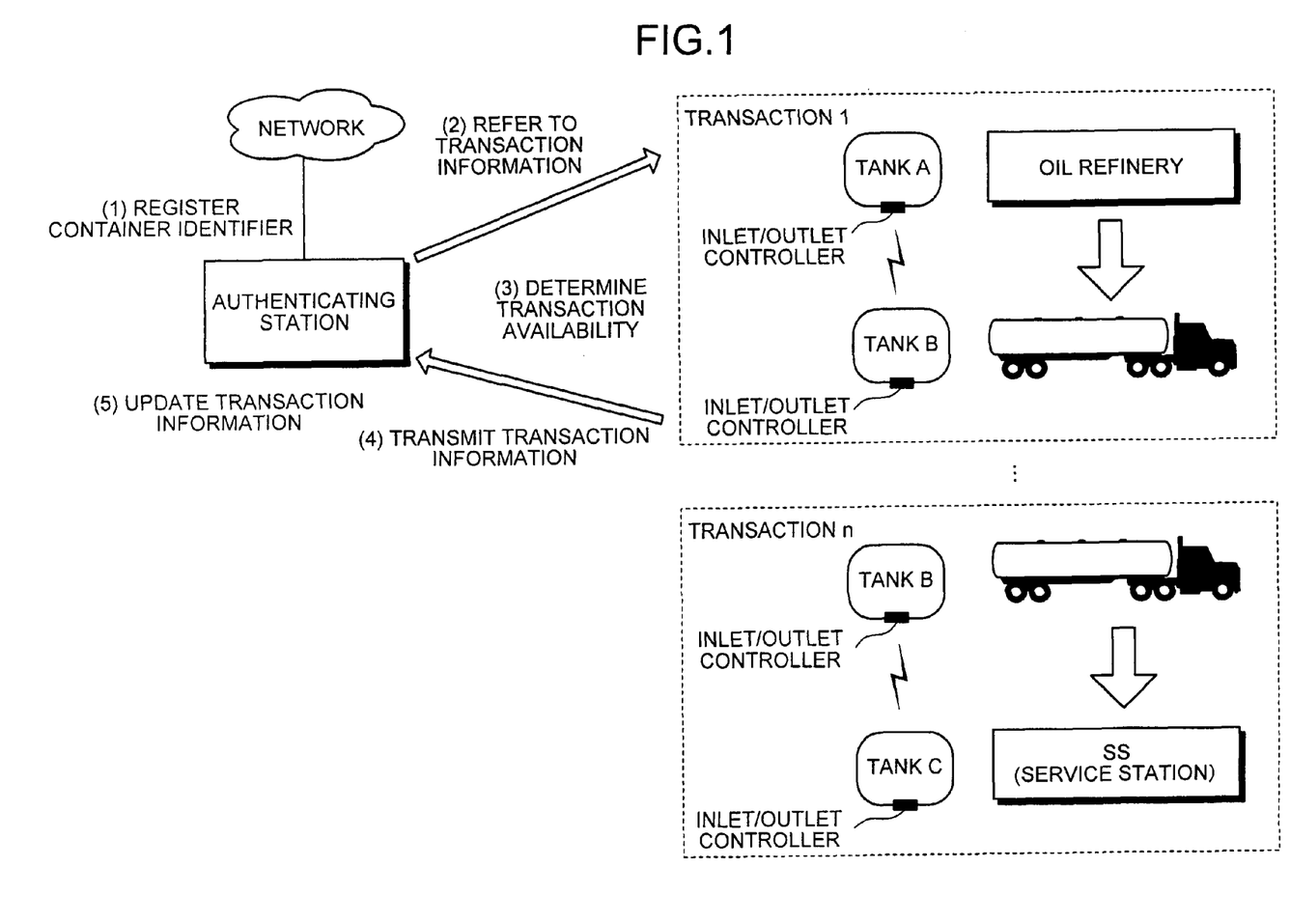
FIG. 1 is a schematic for explaining a general concept of a quality assurance system according to the present invention.

FIG. 1 is a schematic for explaining a general concept of the quality assurance system according to the present invention. The quality assurance system according to the present invention includes an authenticating station provided on a network, through which the quality assurance system according to the present invention is established, and includes an inlet/outlet controller installed in the business place, such as the oil refinery, the oil stock base, and the service station (gas station), and in a tank of the transportation equipment such as the tank truck. The inlet/outlet controller stores a container identifier for identifying each container and controls opening and closing of the inlet/outlet based on the container identifier and transaction information exchanged between the authenticating station and other inlet/outlet controllers.

As shown in FIG. 1, the container identifier for identifying a tank managed by an authorized trader is registered in advance in the authenticating station provided on the network (see, (1) in FIG. 1). For each transaction such as loading oil from the oil refinery to the tank truck, discharging oil from the tank truck to the oil stock base, and discharging oil from the tank truck to the service station (SS), a reference processing for referring to transaction information is performed with the authenticating station to determine whether containers used for delivering oil are authenticated and transaction records are valid (see, (2) in FIG. 1).

The validity of the transaction records is required for assuring oil quality, because, in an area of oil distribution, different companies such as an oil-manufacturing company, an oil-transporting company, and an oil-distributing company are involved, and if any one of each company mixes unauthorized oil, it is difficult to distinguish between authorized oil and the unauthorized oil through the appearance of the oil. Therefore, validities of all transactions at all distribution stages from manufacturing the oil to distributing the oil to an end user heed to be assured, so that the assurance of the oil quality can be realized.

With the quality assurance system according to the present invention, the authenticating station is provided for authenticating a validity of performed transaction, and each transaction is performed after the past transaction records are determined as valid with reference to information managed by the authenticating station (see, (3) in FIG. 1). Whenever the transaction is performed, new transaction information is transmitted to the authenticating station (see, (4) in FIG. 1), and the authenticating station receives and updates the new transaction information (see, (5) in FIG. 1).

As explained above, with the quality assurance system according to the present invention, whenever the oil transaction is to be performed, the validity of the past transaction records are examined before performing the transaction, and whenever the transaction is performed, new transaction information is registered. Therefore, the assurance of the oil quality can be realized at all distribution stages. Although the assurance of the oil quality will be explained according to an embodiment of the present invention, the quality assurance system according to the present invention is not thus limited, and can be applied to other products (i.e., liquid product, gaseous product, and granulated solid product) supplied in a container for a transaction.

Further, with the quality assurance system according to the present invention, main functions of the inlet/outlet controller installed in the business place such as the oil refinery, the oil stock base, and the service station (gas station), and in the transportation equipment such as the tank truck are configured in a security chip. Therefore, fraudulent alteration of the inlet/outlet controller by each trader can be prevented and the validity of the transaction can be assured.

Figure 2:
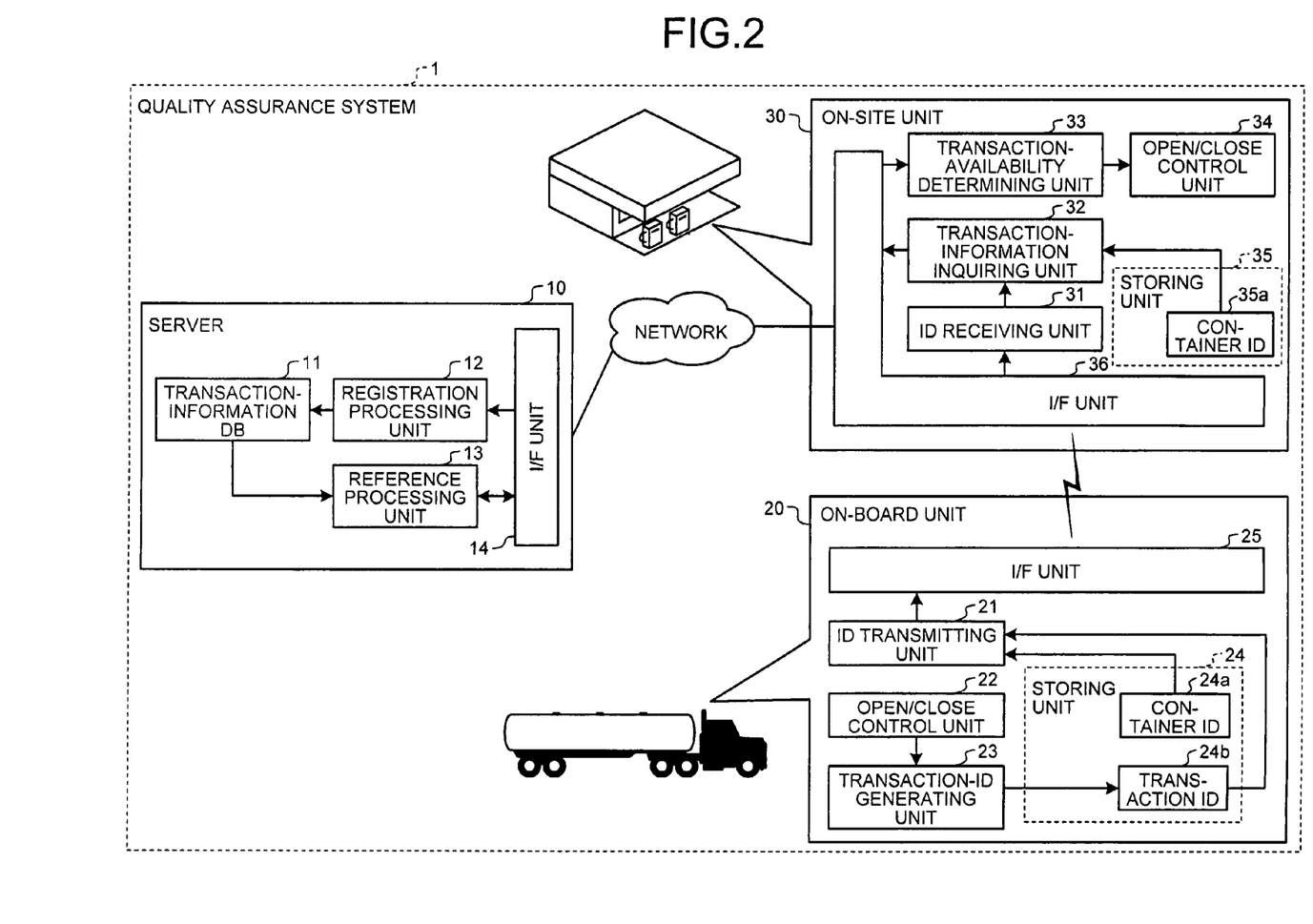
FIG. 2 is a schematic of a configuration of the quality assurance system according to the present invention.

FIG. 2 is a schematic of a configuration of a quality assurance system 1. The quality assurance system 1 includes a server 10 provided in the authenticating station shown in FIG. 1, an on-board unit 20, and an on-site unit 30. The on-board unit 20 and the on-site unit 30 correspond to the inlet/outlet controllers shown in FIG. 1.

In FIG. 2, it is assumed that the on-board unit 20 corresponds to the inlet/outlet controller installed in the transportation equipment such as the tank truck, while the on-site unit 30 corresponds to the inlet/outlet controller installed in the business place such as the service station. However, the inlet/outlet controller can be configured to have both functions of the on-board unit 20 and the on-site unit 30.

The server 10 performs processing of assuring validity of the transaction by managing the transaction information and includes a transaction information database (DB) 11, a registration processing unit 12, a reference processing unit 13, and an interface (I/F) unit 14. The transaction-information DB 11 manages identifiers associated with an authenticated container (i.e., tank) used for the transaction and manages details of the transaction.

Figure 3:
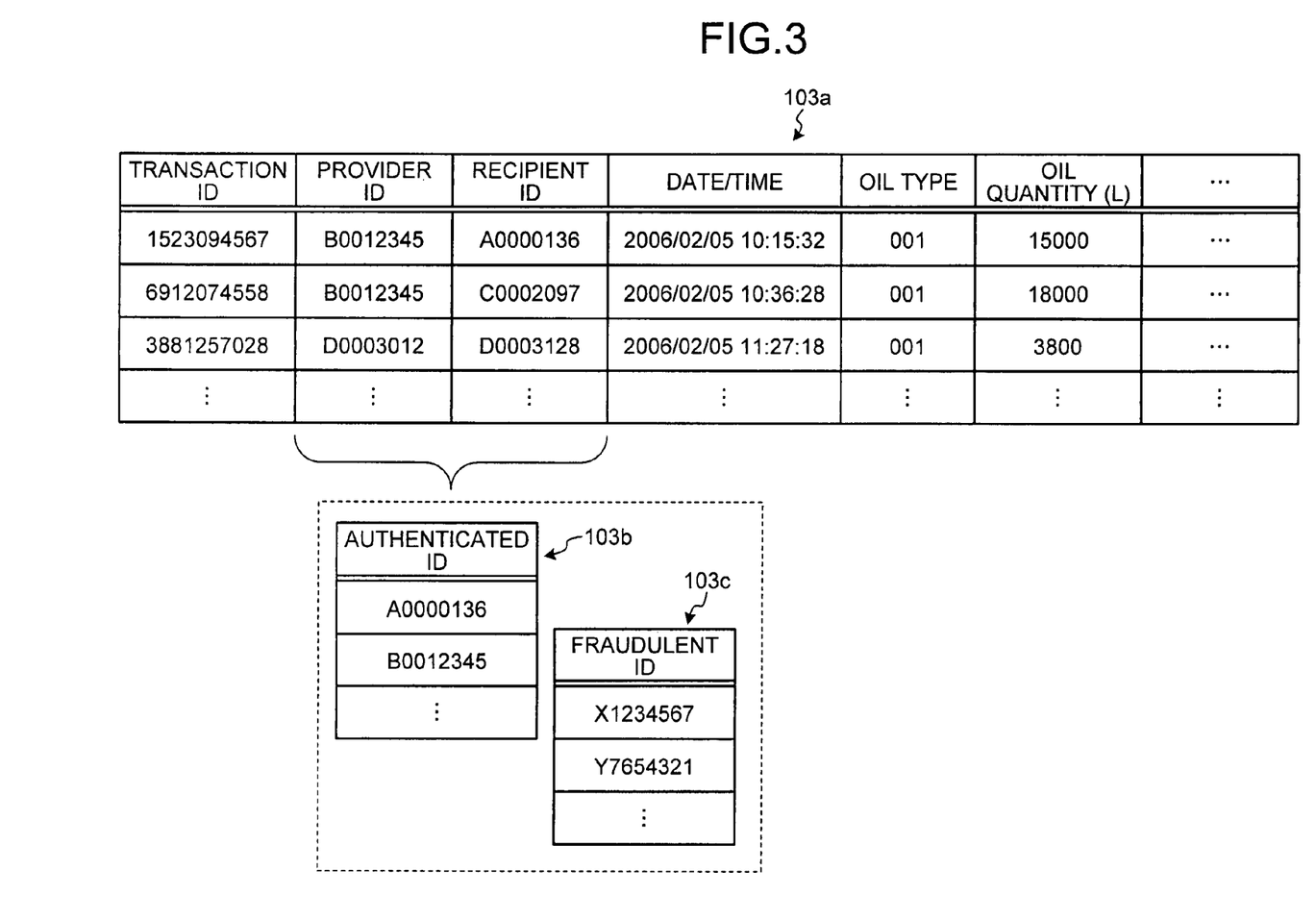
FIG. 3 is an example of the contents of a transaction-information database according to the present invention.

FIG. 3 is an example of the contents of the transaction-information DB 11. The transaction-information DB 11 manages records including such items as a transaction ID for identifying each transaction, a provider ID for identifying a container used by a provider of the oil, a recipient ID for identifying a container used by a recipient of the oil, date and time when the transaction is performed, an oil type corresponding to a type of transacted oil, and an oil quantity corresponding to a quantity of the transacted oil (see, 103a in FIG. 3)

It is preferable that the transaction-information DB 11 includes information of, for example, temperature and pressure as subsidiary information. Accordingly, the oil quantity, which is changeable due to a change of the temperature and the pressure, can be accurately managed.

For making each transaction ID unique in the quality assurance system 1, for example, a unique device identifier is associated in advance with each on-board unit 20 in the quality assurance system 1, and each on-board unit 20 generates each transaction ID based on the associated device identifier.

Further, the transaction-information DB 11 determines whether the provider ID and the recipient ID are included in a pre-registered authenticated ID (see, 103b in FIG. 3), and manages a fraudulent ID for a container with which a fraudulent transaction is performed (see, 103c in FIG. 3).

The registration processing unit 12 performs processing for registering new transaction information that is transmitted from the on-site unit 30 and to be registered into the transaction-information DB 11. The reference processing unit 13, when receiving a request from the on-site unit 30 for referring to the transaction information, performs processing for returning corresponding information by searching the transaction-information DB 11. The server 10 can be configured with functions of a web server, so that the registration processing unit 12 and the reference processing unit 13 can be accessed via a web browser.

The I/F unit 14 is configured with a communication device such as a local area network (LAN) board and transmits/receives data between the server 10 and the on-site unit 30 via the network.

The on-board unit 20 is the inlet/outlet controller installed in the transportation equipment such as the tank truck and includes an ID transmitting unit 21, an open/close control unit 22, a transaction-ID generating unit 23, a storing unit 24, and an I/F unit 25. The storing unit 24 stores a container ID 24a and a transaction ID 24b.

The ID transmitting unit 21 transmits information including the container ID 24a and the transaction ID 24b to the on-site unit 30 before an oil transaction starts. The open/close control unit 22 controls opening and closing of the inlet/outlet of the container (tank) and sends information such that the inlet/outlet gets open to the transaction-ID generating unit 23.

The transaction-ID generating unit 23, when receiving the information such that the inlet/outlet gets open from the open/close control unit 22, generates the unique transaction ID 24b using random numbers. Further, the transaction-ID generating unit 23 performs processing for registering the generated transaction ID 24b to the storing unit 24.

The storing unit 24 is configured with a storage device such as a nonvolatile random access memory (RAM) and stores the container ID 24a and the transaction ID 24b. The container ID 24a is an identifier for identifying the container such as the tank and statically stored in the storing unit 24. When a single on-board unit 20 manages a plurality of tanks, a plurality of the container IDs 24a can be stored in the storing unit 24.

The transaction ID 24b is an identifier for identifying each transaction and generated by the transaction-ID generating unit 23. The container ID 24a and the transaction ID 24b are retrieved and transmitted to the on-site unit 30 by the ID transmitting unit 21 when the transaction starts. The I/F unit 25 transmits/receives data between an I/F unit 36 in the on-site unit 30 and the on-board unit 20, and is configured with a wired communication device or a wireless communication device.

The on-site unit 30 is the inlet/outlet controller that receives information including the container ID 24a and the transaction ID 24b from the on-board unit 20 when the transaction starts. Further, the on-site unit 30 sends a query to the server 10 whether the oil stored in a container of a counterparty to the transaction (the transportation equipment in which the on-board unit 20 is installed) has a valid transaction record, based on the received information, and determines whether the transaction is to be performed or to be canceled based on the result of the query.

The on-site unit 30 includes an ID receiving unit 31, a transaction-information inquiring unit 32, a transaction-availability determining unit 33, an open/close control unit 34, a storing unit 35, and the I/F unit 36.

The ID receiving unit 31 receives information including the container ID 24a and the transaction ID 24b transmitted from the on-board unit 20 and sends the received information to the transaction-information inquiring unit 32. The transaction-information inquiring unit 32 sends a query of referring to the transaction information to the server 10 based on the information received from the ID receiving unit 31 and a container ID 35a stored in the storing unit 35.

The transaction-availability determining unit 33 receives, from the server 10, a return corresponding to the query sent from the transaction-information inquiring unit 32, and determines availability of the transaction based on the received return. The transaction-availability determining unit 33 instructs opening and closing of the inlet/outlet to the open/close control unit 34 based on the determined result of the availability of the transaction. It is, possible to configure so that the result obtained from the transaction-availability determining unit 33 is displayed on a display unit or is notified via an audio device.

The open/close control unit 34 controls opening and closing of the inlet/outlet of the container (tank). The storing unit 35 is configured with a storage device such as the nonvolatile RAM and stores the container ID 35a. The container ID 35a is an identifier for identifying the container such as the tank and statically stored in the storing unit 35. When a single on-site unit 30 manages a plurality of the tanks, a plurality of the container IDs 35a can be stored in the storing unit 35. The I/F unit 36 transmits/receives data between the server 10, the I/F unit 25 in the on-board unit 20, and the on-site unit 30, and is configured with a wired communication device or a wireless communication device.

It is preferable that the on-board unit 20 and the on-site unit 30 are configured on a security chip implemented with a specification determined by an organization named trusted computing group (TCG). Accordingly, a fraudulent alteration of information stored in the storing unit, and programs and/or data used for performing functions of each processing, can be prevented. A configuration of the security chip is explained later with reference to FIGS. 9 and 10.

Figure 4:
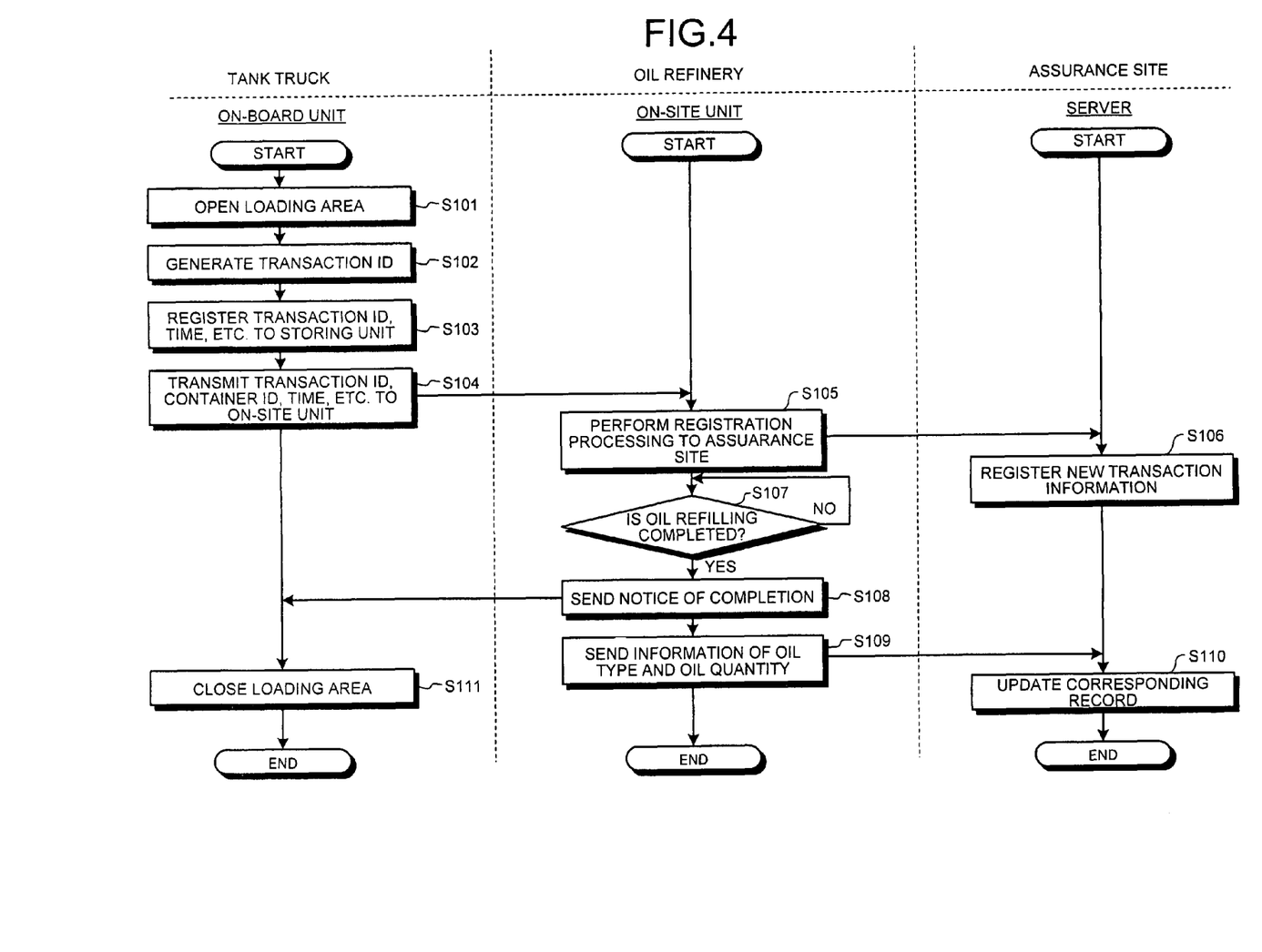
FIG. 4 is a sequence diagram of a processing procedure for an operation of loading oil from an oil refinery to a tank truck according to the present invention.

FIG. 4 is a sequence diagram of a processing procedure for an operation of loading oil from the oil refinery to the tank truck according to the present invention. It is assumed that the on-board unit 20 is installed in the tank truck, the on-site unit 30 is installed in the oil refinery, and the server 10 is installed in an assurance site.

A loading area of the tank truck gets open (step S101), the open/close control unit 22 sends information such that the loading area gets open to the transaction-ID generating unit 23, and the transaction-ID generating unit 23 generates the transaction ID 24b (step S102). The transaction-ID generating unit 23 registers the transaction ID 24b, time, etc. to the storing unit 24 (step S103). The ID transmitting unit 21 transmits the transaction ID 24b, the container ID 24a, time, etc. to the on-site unit 30 (step S104).

The on-site unit 30 receives the transaction ID 24b, the container ID 24a, time, etc. from the on-board unit 20 and accesses to the server 10 for performing processing to register the received information into the assurance site (step S105). The server 10 receives the request of performing processing of the registration from the on-site unit 30 and registers new transaction information to the transaction-information DB 11 (step S106).

The on-site unit 30 completes the processing procedure of step S105, starts refilling oil to the tank truck, and monitors whether oil refilling is completed (step S107). For monitoring the oil refilling, for example, the on-site unit 30 sends a query to the on-board unit 20 about a target quantity of the oil to be refilled (i.e., a capacity of the tank), and temporarily stores, in the storing unit 35, a return sent from the on-board unit 20. Thereafter, the on-site unit 30 receives information of current capacity of the tank (i.e., available quantity for refilling the oil), and if the oil refilling is not completed (NO at step S107), continues the oil refilling up to the target amount.

When the oil refilling is completed (YES at step S107), the on-site unit 30 sends a notice of completion to the on-board unit 20 (step S108), sends information of type and quantity of the refilled oil to the server 10 (step S109), and process terminates. When the server 10 receives the notice and information, the server 10 updates corresponding records in the transaction-information DB 11 (step S110) and process terminates. When the on-board unit 20 receives the notice of completion sent at step S108, the open/close control unit 22 closes the loading area (step S111) and process terminates.

Figure 5:
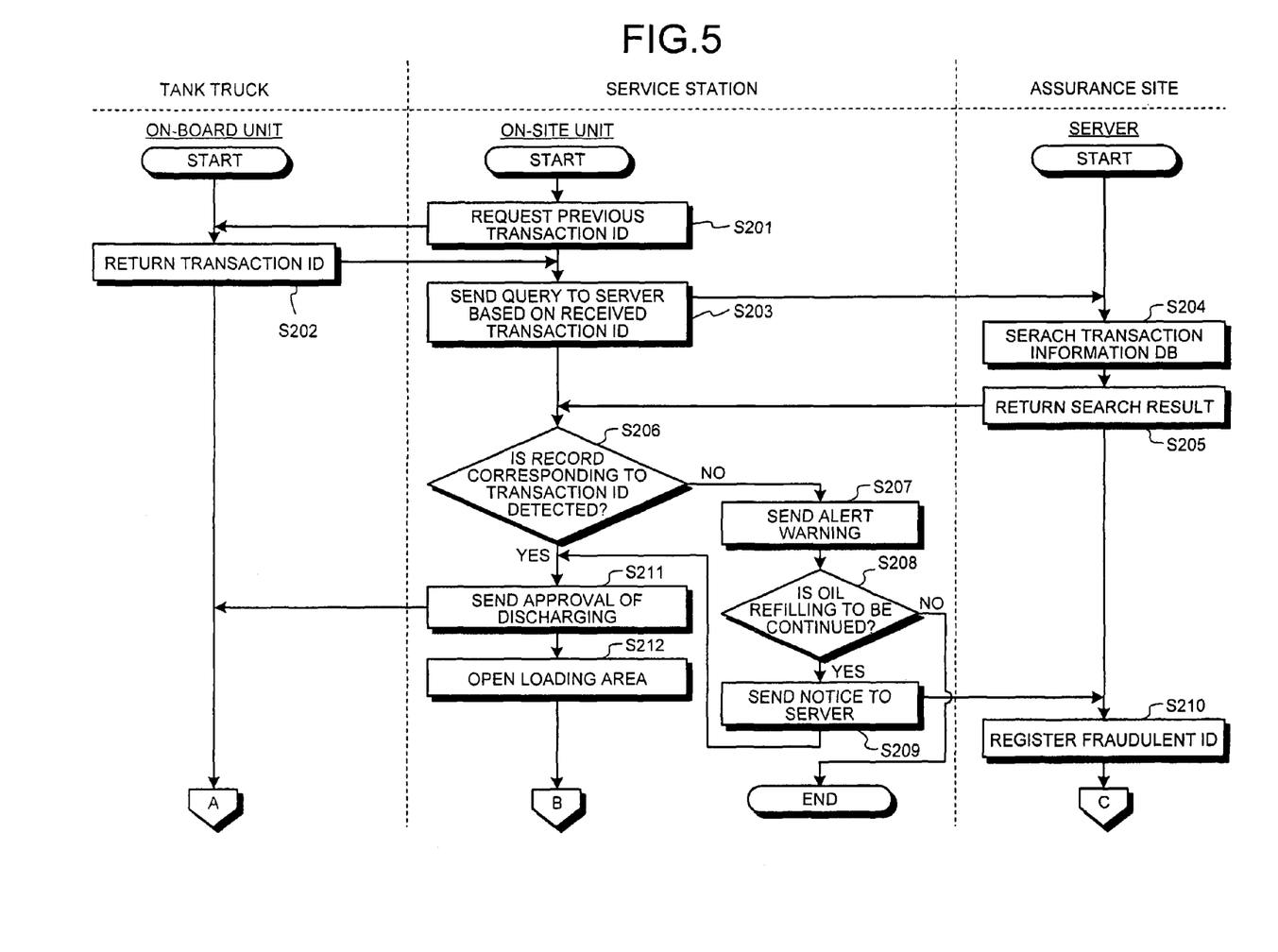
FIG. 5 is a first sequence diagram of a processing procedure for an operation of discharging oil from a tank truck to a service station according to the present invention.
Figure 6:
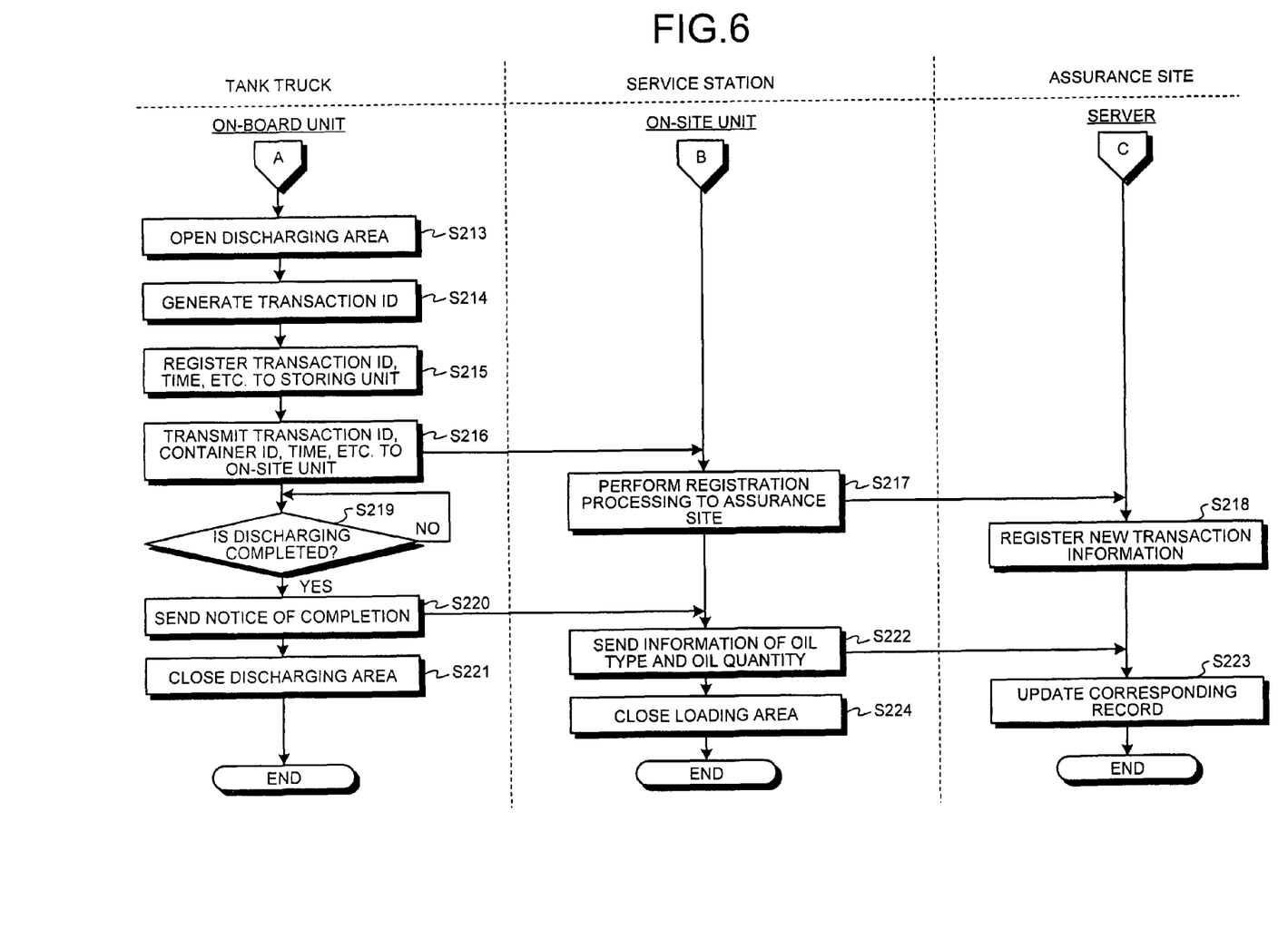
FIG. 6 is a second sequence diagram of a processing procedure for an operation of discharging oil from the tank truck to the service station according to the present invention.

FIGS. 5 and 6 are sequence diagrams of a processing procedure for an operation of discharging oil from the tank truck to the service station according to the present invention. The on-site unit 30 sends a request of acquiring the previous transaction ID 24*b* (step S201). The on-board unit 20 receives the request and returns the transaction ID 24*b* stored in the storing unit 24 (step S202).

The transaction-information inquiring unit 32 in the on-site unit 30 receives the transaction ID 24*b* and sends a query of the transaction records to the server 10, based on the received transaction ID 24*b* (step S203). The server 10 receives the query and searches the transaction-information DB 11 (step S204) and returns a search result to the on-site unit 30 (step S205).

The on-site unit 30 receives the return from the server 10 and determines whether the content of the received return is such that the records corresponding to the transaction ID is detected (step S206). When the content of the received return is such that the records corresponding to the transaction ID is not detected (NO at step S206), the on-site unit 30 sends an alert warning (step S207).

When an operator received the alert warning starts refilling the oil (YES at step S208), the on-site unit 30 sends a notice such that the oil refilling is performed to the server 10 (step S209). The server 10 receives the notice and registers the fraudulent ID in the transaction-information DB 11 (step S210). A situation, in which the oil refilling is continued even after the alert warning is sent, can be assumed such that there is an emergency situation or a system is broken, so that it is necessary to transact the oil even the quality is not assured. When the oil refilling is canceled (NO at step S208), process terminates.

When the content of the received return is such that the records corresponding to the transaction ID is detected (YES at step S206), the on-site unit 30 sends an approval of discharging to the on-board unit 20 (step S211) and opens the loading area (step S212).

The on-board unit 20 on the tank truck receives the approval of discharging from the on-site unit 30 installed in the service station, detects the opening of the discharging area (step S213), and generates the transaction ID 24*b* (step S214) as shown in FIG. 6. The on-board unit 20 registers the transaction ID 24*b*, time, etc. to the storing unit 24 (step S215) and transmits the information to the on-site unit 30 (step S216).

The on-site unit 30 receives the transaction ID 24*b*, the container ID 24*a*, time, etc. from the on-board unit 20 and accesses to the server 10 for performing registration processing to the assurance site (step S217). The server 10 receives a request of performing the registration processing from the on-site unit 30 and registers the new transaction information to the transaction-information DB 11 (step S218).

The on-board unit 20 completes the processing procedures of step S216 and monitors whether oil discharging is completed (step S219). When the oil discharging is not completed (NO at step S219), the oil discharging is continued up to the target amount. When the oil discharging is completed (YES at step S219), the on-board unit 20 sends a notice of completion including the type and the quantity of the discharged oil to the on-site unit 30 (step S220), closes the discharging area (step S221), and process terminates.

When the on-site unit 30 receives the notice of completion, the on-site unit 30 sends information of the oil type and the oil quantity to the server 10 (step S222), closes the loading area (step S224), and process terminates. When the server 10 receives the notice and information sent at step S222, the server 10 updates the corresponding records in the transaction-information DB 11 (step S223) and process terminates.

Figure 7:
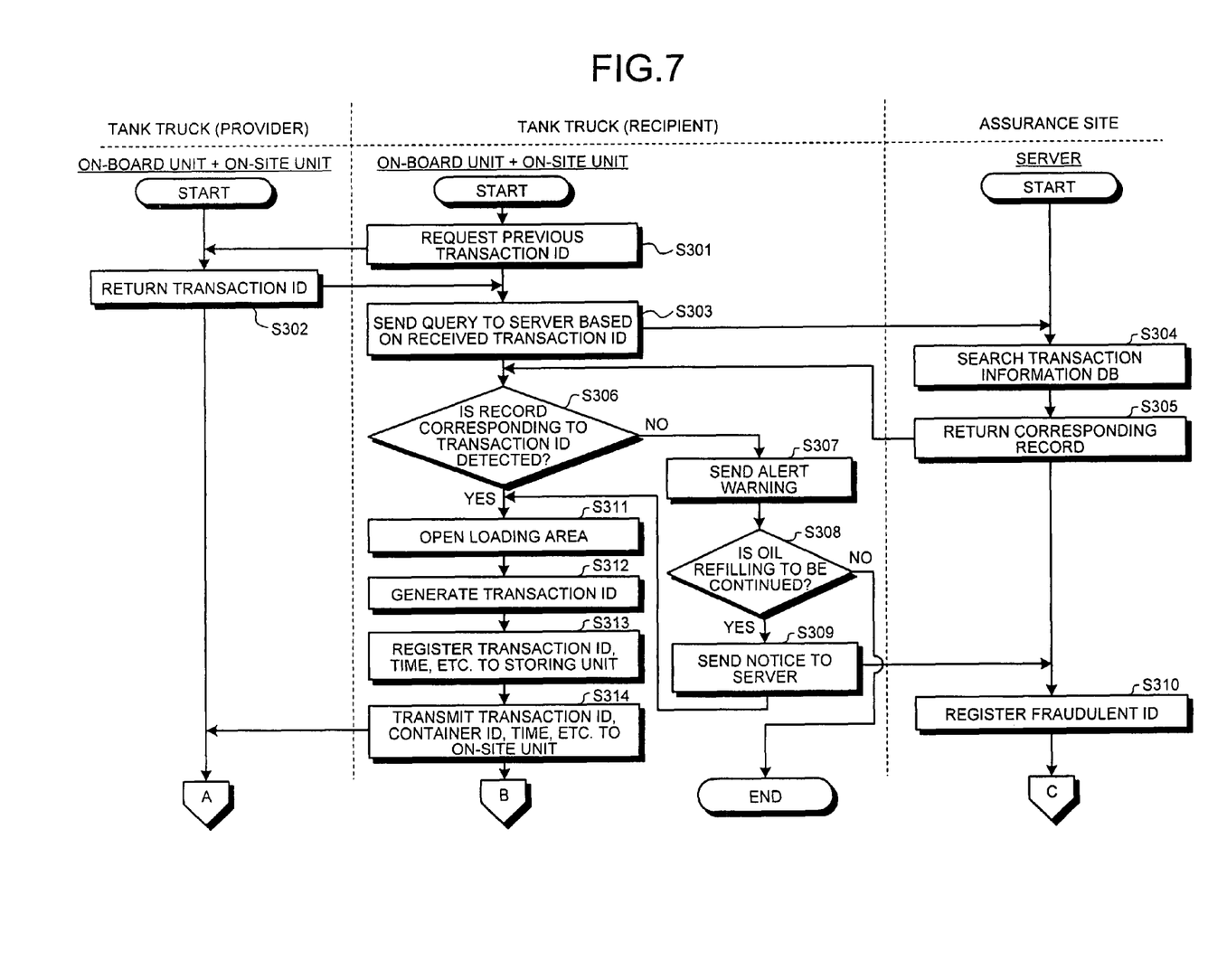
FIG. 7 is a first sequence diagram of a processing procedure for an operation of transacting oil between tank trucks according to the present invention.
Figure 8:
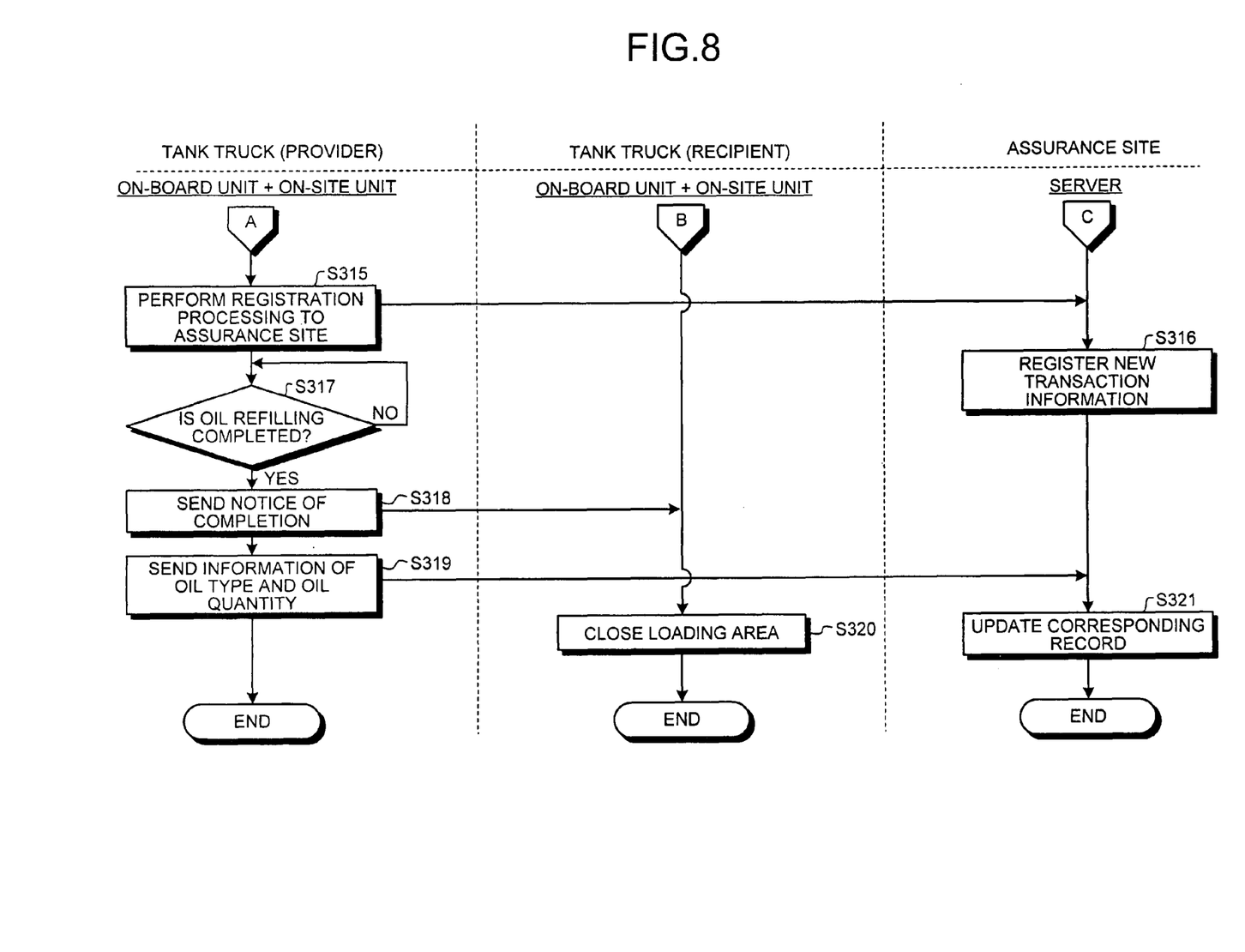
FIG. 8 is a second sequence diagram of a processing procedure for an operation of transacting oil between the tank trucks according to the present invention.

FIGS. 7 and 8 are sequence diagrams of a processing procedure for an operation of transacting oil between the tank trucks according to the present invention. The tank trucks shown in FIGS. 7 and 8 include the on-board unit 20 and the on-site unit 30.

A recipient tank truck sends a request of acquiring the previous transaction ID 24*b* to a provider tank truck (step S301). The provider tank truck receives the request and returns the transaction ID 24*b* (step S302). The recipient tank truck receives the return and sends a query to the server 10 based on the received transaction ID 24*b* (step S303).

When the server 10 receives the query, the server 10 searches the transaction-information DB 11 (step S304) and returns a corresponding record (step S305). The recipient tank truck receives the return and determines whether the content of the received return is such that the record corresponding to the transaction ID 24*b* is detected (step S306). When the content of the received return is such that the record corresponding to the transaction ID 24*b* is not detected (NO at step S306), the recipient tank truck sends the alert warning (step S307).

When an operator received the alert warning starts refilling the oil (YES at step S308), the recipient tank truck sends a notice such that the oil refilling is performed to the server 10 (step S309). The server 10 receives the notice and registers the fraudulent ID in the transaction-information DB 11 (step S310). A situation, in which the oil refilling is continued even after the alert warning is sent, can be assumed such that there is an emergency situation or a system is broken, so that it is necessary to transact the oil even the quality is not assured. When the oil refilling is canceled (NO at step S308), process terminates.

When the content of the received return is such that the record corresponding to the transaction ID 24*b* is detected (YES at step S306), the recipient tank truck opens the loading area (step S311), generates the transaction ID 24*b* (step S312), and registers the transaction ID 24*b*, the container ID 24*a*, time, etc. to the storing unit 24 (step S313). Further, the recipient tank truck transmits the transaction ID 24*b*, the container ID 24*a*, time, etc. to the on-site unit 30 installed in the provider tank truck (step S314).

The provider tank truck receives the transaction ID 24*b*, the container ID 24*a*, time, etc. from the recipient tank truck, and performs registration processing of the received information for the assurance site (step S315) as shown in FIG. 8. The server 10 receives a request of performing the registration processing and registers the new transaction information (step S316). The provider tank truck completes the operation of step S315, starts refilling the oil to the recipient tank truck, and monitors whether the oil refilling is completed (step S317). When the oil refilling is not completed (NO at step S317), the oil refilling is continued up to the target amount.

When the oil refilling is completed (YES at step S317), the provider tank truck sends a notice of completion to the recipient tank truck (step S318), sends information of the type and the quantity of the refilled oil to the server 10 (step S319), and process terminates. When the server 10 receives the notice of completion, the server 10 updates a corresponding record in the transaction-information DB 11 (step S321) and process terminates. When the recipient tank truck receives the notice of completion sent at step S318, the recipient tank truck closes the loading area (step S320) and process terminates.

Figure 9:
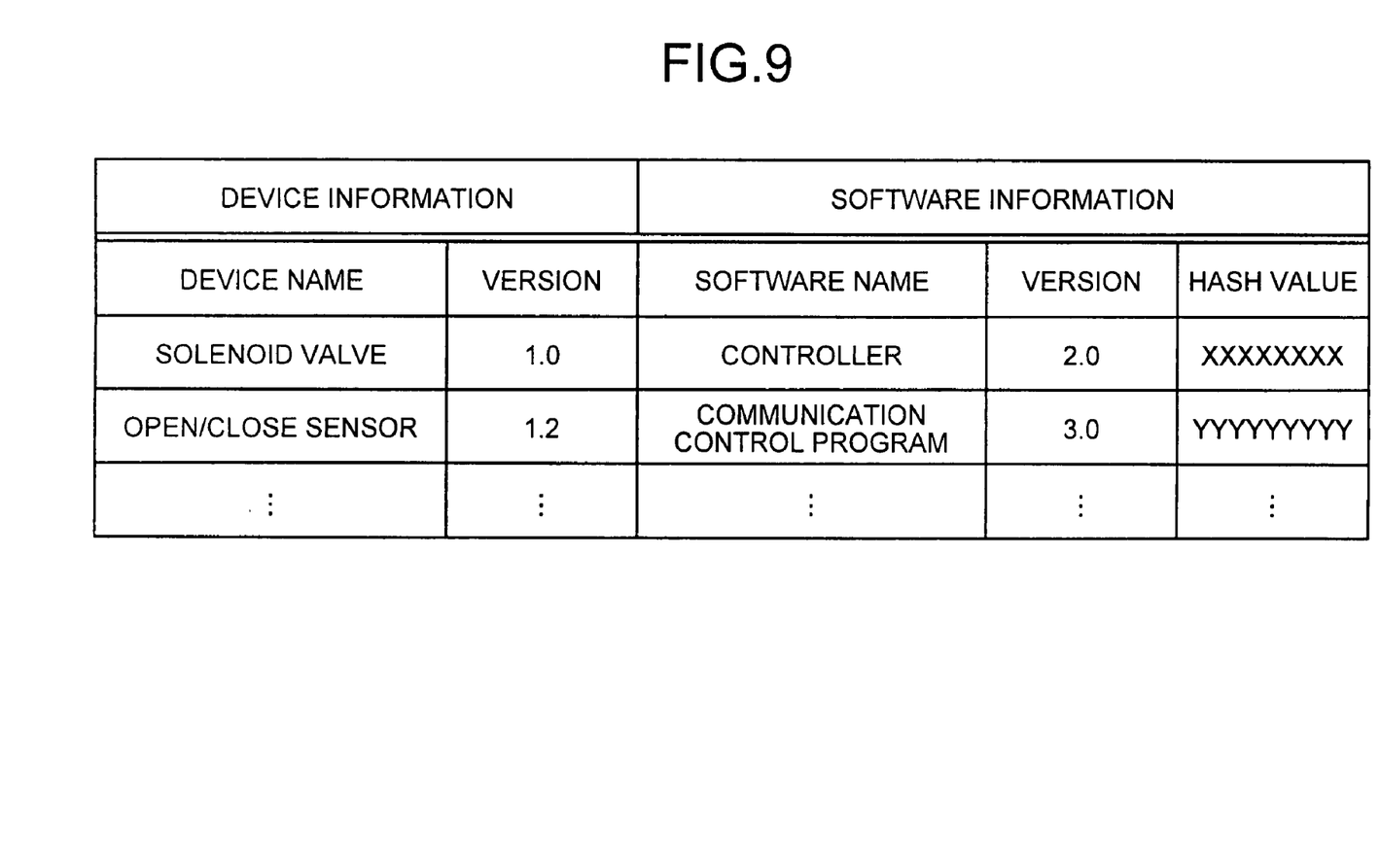
FIG. 9 is an example of the contents of data stored in a security chip according to the present invention.

FIG. 9 is an example of the contents of data stored in the security chip according to the present invention. The security chip includes device information related to devices connected via the network and software information related to programs executed on the security chip.

The device information includes a device name such as a solenoid valve and a version such as 1.0. The software information includes a software name such as a controller, a version such as 2.0, and a hash value obtained from the program through the hash function.

As explained, because the information related to the connected devices and the information related to programs to be executed are managed, a fraud such as replacing the connected device to an unauthorized device, or altering the software can be prevented. Accordingly, it becomes possible to prevent a fraudulent alteration of the software and the data, by storing the information stored in each processing unit and storing unit in the on-board unit 20 and the on-site unit 30 onto the security chip.

Figure 10:
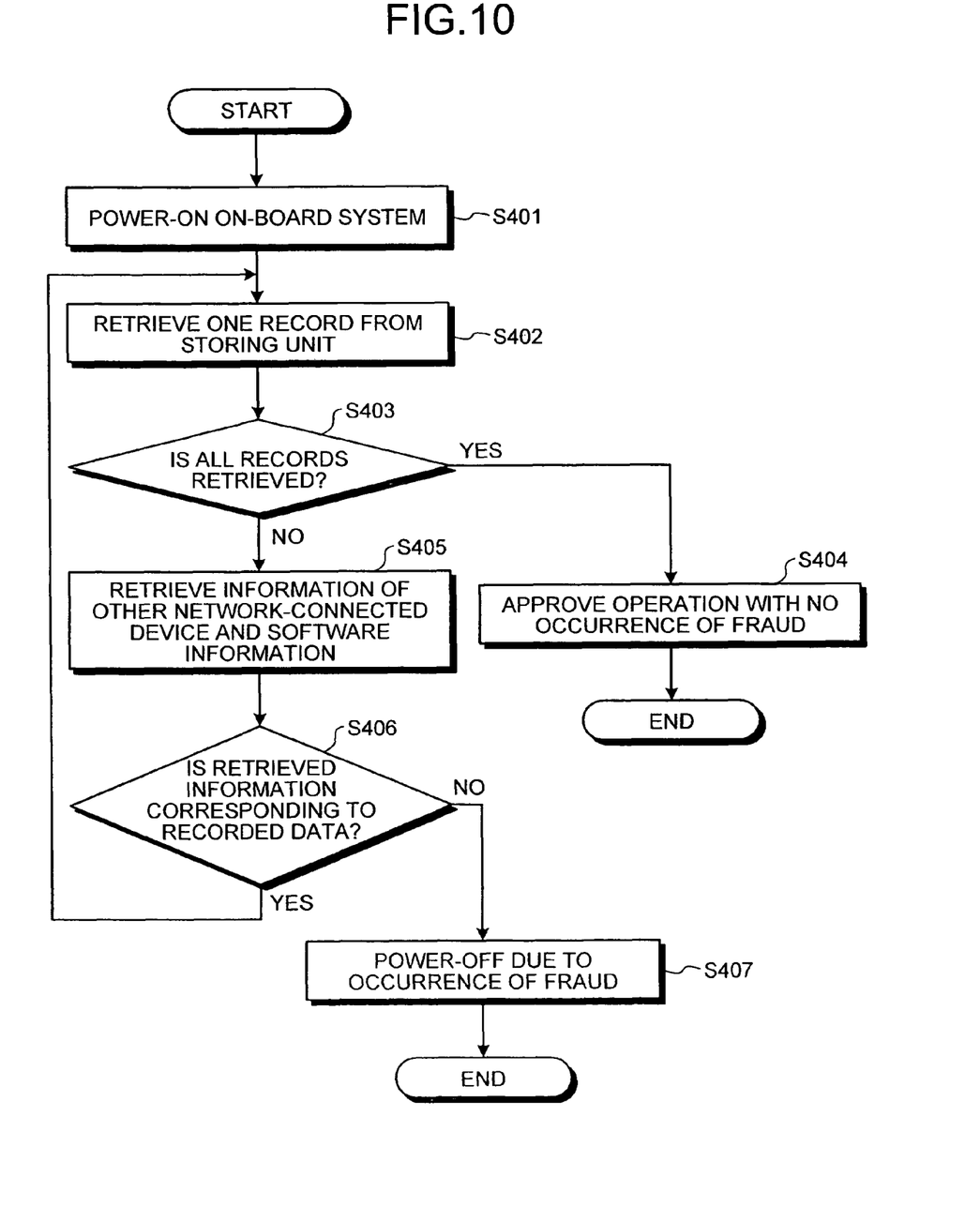
FIG. 10 is a flowchart of a processing procedure for an operation of activating the security chip according to the present invention.

FIG. 10 is a flowchart of a processing procedure for an operation of activating the security chip, when the security chip is installed in the transportation equipment such as the tank truck, according to the present invention.

When the power of the on-board unit 20 is turned on (step S401), the security chip retrieves a single record (see, FIG. 9) from the storing unit 24 (step S402). The security chip determines whether all records are retrieved (step S403). When the all records are retrieved (YES at step S403), the security chip determines that there is no occurrence of fraud, approves an operation (step S404), and process terminates.

When the all records are not retrieved (NO at step S404), the security chip retrieves other network-connected device information and the software information (step S405), and determines whether the retrieved data corresponds to the recorded data (step S406). When the retrieved data corresponds to the recorded data (YES at step S406), process control returns to step S402 to check the rest of the records. When the retrieved data does not correspond to the recorded data (NO at step S406), the security chip determines that there is an occurrences of fraud, turns the power off (step S407), and process terminates.

For activating the security chip, if pre-registered information related to the network-connected device and/or the software (program) does not correspond to information related to an on-line device and/or active software (program), the security chip does not approve the operation, resulting in preventing a fraudulent alteration of the network-connected device and the software. As a result, it becomes possible to assuredly realize a quality assurance processing in the quality assurance system 1.

According to the present invention, the quality assurance system includes the server installed in the authenticating station, the on-board unit installed in the transportation equipment such as the tank truck, and the on-site unit installed in the business place such as the oil refinery and the service station. The server manages the container identifier of the authorized container provided in the business place and in the transportation equipment, and includes the transaction-information DB that updates transaction status as the transaction information. The on-site unit sends a query to the server regarding the validity of the transaction records of oil transaction, based on the transaction ID stored in the on-board unit, performs the transaction only when the validity is assured, and registers the transaction information related to the performed transaction into the server.

Accordingly, the assurance of the oil quality can be realized at all distribution stages. Although the assurance of the oil quality is explained according to the embodiment of the present invention, the quality assurance system is not limited to the oil transaction, and can be applied to other products (i.e., liquid product, gaseous product, and granulated solid product) supplied in a container for a transaction.

Each apparatus according to the embodiment of the present invention is functionally explained; however, each function of each apparatus can be realized by causing a computer, such as a personal computer and a workstation, to execute programs.

Namely, the operation procedure according to the embodiment of the present invention can be realized by executing a predetermined program by the computer. The program can be obtained via a network such as the Internet. Further, the program can be stored in such a computer readable recording medium as a hard disk, a flexible disk (FD), compact disk-read only memory (CD-ROM), a magneto optical (MO) disk, and a digital versatile disk (DVD), and can be read by a computer for performing the operation procedure.

According to an embodiment of the present invention, the identifier of the authorized container is managed, it is determined whether containers used for delivering products are authorized before the products are delivered between the containers, and the transaction of the products is to be approved only when the containers are determined as authorized. As a result, the quality assurance of the products supplied in the containers can be realized at all the distribution stages.

Furthermore, according to an embodiment of the present invention, the inquiring unit and/or the transaction approving unit are installed in the security chip in the inlet/outlet control unit that controls opening and closing of the inlet/outlet of the authorized container. Therefore, a fraudulent alteration of the programs used for performing functions of each processing unit and of the data stored in the storing unit can be prevented, resulting in improving reliability of the quality assurance system.

Moreover, according to an embodiment of the present invention, the transaction identifier for identifying the performed transaction and the identifier of the authorized container used for the performed transaction are registered. As a result, each transaction can be easily identified and a search of the transaction related to each authorized container can be easy.

Furthermore, according to an embodiment of the present invention, it is configured to determine whether the provider container and the recipient container are authorized based on the transaction identifier stored in the provider container. As a result, the validity of the provider container can be determined through an easy processing.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A system for assuring quality of a transaction, the system comprising:
   an inlet/outlet controller comprising a transaction-identifier generating unit that generates, when a port of a container is opened, a transaction identifier and registers the transaction identifier to a storage unit, and an identifier transmitting unit that transmits the transaction identifier to a first on-site device;
   a server comprising a registration processing unit that receives the transaction identifier from the first on-site device and updates a transaction information database based on the transaction identifier;

a second on-site device comprising an identifier receiving unit that receives, from the inlet/outlet controller, a transaction identifier stored in the storage unit, a transaction-information inquiring unit that inquires of the server whether the transaction identifier received by the identifier receiving unit has been registered to the transaction information database, and a transaction-availability determining unit that receives a response indicating whether the transaction identifier received by the identifier receiving unit has been registered to the transaction information database and sends a warning when the transaction identifier received by the identifier receiving unit has not been registered.

2. The system according to claim 1, wherein
at least one of the transaction-identifier generating unit, the transaction-information inquiring unit, and the transaction-availability determining unit is implemented in a security chip.

3. The system according to claim 1, wherein
the server registers information on a transaction corresponding to the transaction identifier that has not been registered to the transaction information database when the transaction corresponding to the transaction identifier that has not been registered is performed after the warning is sent.

4. The system according to claim 1, wherein
the inlet/outlet controller and the first on-site device are installed in a first transporting equipment and the second on-site device is installed in a second transporting equipment.

5. A method of assuring quality of a transaction, the method comprising:

an inlet/outlet controller comprising a transaction-identifier generating unit generating, when a port of a container is opened, a transaction identifier and registering the transaction identifier to a storage unit, and an identifier transmitting unit transmitting the transaction identifier to a first on-site device;

a server comprising a registration processing unit receiving the transaction identifier from the first on-site device and updating a transaction information database based on the transaction identifier;

a second on-site device comprising an identifier receiving unit, receiving from the inlet/outlet controller, a transaction identifier stored in the storage unit, a transaction-information inquiring unit inquiring of the server whether the transaction identifier received by the identifier receiving unit has been registered to the transaction information database, and a transaction-availability determining unit receiving a response indicating whether the transaction identifier received by the identifier receiving unit has been registered to the transaction information database and sending a warning when the transaction identifier received by the identifier receiving unit has not been registered.

6. The method according to claim 5, wherein
at least one of the transaction-identifier generating unit, the transaction-information inquiring unit, and the transaction-availability determining unit is implemented in a security chip.

7. The method according to claim 5, further comprising
the server registering information on a transaction corresponding to the transaction identifier that has not been registered to the transaction information database when the transaction corresponding to the transaction identifier that has not been registered is performed after the warning is sent.

8. The method according to claim 5, wherein
the inlet/outlet controller and the first on-site device are installed in a first transporting equipment and the second on-site device is installed in a second transporting equipment.

* * * * *